US012387604B2

(12) United States Patent
Chintakindi et al.

(10) Patent No.: US 12,387,604 B2
(45) Date of Patent: Aug. 12, 2025

(54) ACCIDENT PREDICTION AND CONSEQUENCE MITIGATION CALCULUS

(71) Applicant: Allstate Insurance Company, Northbrook, IL (US)

(72) Inventors: Sunil Chintakindi, Naperville, IL (US); Regina Madigan, Mountain View, CA (US); Mark V. Slusar, Chicago, IL (US); Timothy W. Gibson, Barrington, IL (US)

(73) Assignee: Allstate Insurance Company, Northbrook, IL (US)

( * ) Notice: Subject to any disclaimer, the term of this patent is extended or adjusted under 35 U.S.C. 154(b) by 236 days.

(21) Appl. No.: 17/492,850

(22) Filed: Oct. 4, 2021

(65) Prior Publication Data

US 2022/0270486 A1 Aug. 25, 2022

Related U.S. Application Data

(63) Continuation of application No. 15/433,090, filed on Feb. 15, 2017, now Pat. No. 11,138,884.

(Continued)

(51) Int. Cl.
*G08G 1/16* (2006.01)
*B60R 21/0134* (2006.01)
(Continued)

(52) U.S. Cl.
CPC ......... *G08G 1/164* (2013.01); *B60R 21/0134* (2013.01); *B60W 30/08* (2013.01);
(Continued)

(58) Field of Classification Search
CPC ... B60R 21/0134; B60W 30/08; B60W 30/09; G08G 1/166; G08G 1/165; G08G 1/164; B62D 6/001; G01S 19/42
See application file for complete search history.

(56) References Cited

U.S. PATENT DOCUMENTS 5,983,161 A 11/1999 Lemelson et al.
6,823,244 B2 11/2004 Breed
(Continued)

OTHER PUBLICATIONS

Apr. 25, 2017 (WO) International Search Report and Written Opinion—App. PCT/US2017/17923 (006591.01485).
(Continued)

*Primary Examiner* — Anne Marie Antonucci
*Assistant Examiner* — Jared C Bean

(57) ABSTRACT

Systems and methods are disclosed for determining that an adverse driving event is likely to occur and utilizing accident calculus algorithms to determine and cause vehicle driving actions necessary to mitigate consequences of the adverse driving event. After determining that an adverse driving event is likely to occur, a computing device my forecast consequences of the driving event. The computing device may determine potential evasive maneuvers that may be taken responsive to the adverse driving event. Additionally, the computing device may determine consequences associated with the potential evasive maneuvers and assign a weight relative to the consequence. The computing device may compare the potential driving maneuvers based on the weighted consequences to determine a driving maneuver to take.

20 Claims, 3 Drawing Sheets

Related U.S. Application Data

(60) Provisional application No. 62/295,300, filed on Feb. 15, 2016.

(51) Int. Cl.
  *B60W 30/08* (2012.01)
  *B60W 30/09* (2012.01)
  *B62D 6/00* (2006.01)
  *G01S 19/42* (2010.01)

(52) U.S. Cl.
  CPC ............ *B60W 30/09* (2013.01); *B62D 6/001* (2013.01); *G08G 1/165* (2013.01); *G08G 1/166* (2013.01); *G01S 19/42* (2013.01)

(56) References Cited

U.S. PATENT DOCUMENTS

| | | | |
|---|---|---|---|
| 7,840,355 B2 | 11/2010 | Breed et al. | |
| 8,606,512 B1 | 12/2013 | Bogovich et al. | |
| 9,108,582 B1 | 8/2015 | Kozloski et al. | |
| 9,296,383 B2 | 3/2016 | Flehmig et al. | |
| 9,633,567 B1* | 4/2017 | Skoog | G08G 5/51 |
| 9,932,033 B2 | 4/2018 | Slusar et al. | |
| 9,940,676 B1 | 4/2018 | Biemer | |
| 2002/0022927 A1* | 2/2002 | Lemelson | G01S 19/11 |
| | | | 340/436 |
| 2007/0299610 A1 | 12/2007 | Ewerhart et al. | |
| 2008/0303696 A1 | 12/2008 | Aso et al. | |
| 2008/0306996 A1 | 12/2008 | McClellan et al. | |
| 2010/0063736 A1* | 3/2010 | Hoetzer | B60W 30/09 |
| | | | 701/301 |
| 2011/0190972 A1 | 8/2011 | Timmons et al. | |
| 2012/0146766 A1 | 6/2012 | Geisler et al. | |
| 2013/0035827 A1 | 2/2013 | Breed | |
| 2013/0060401 A1* | 3/2013 | Hahne | B60W 30/0956 |
| | | | 701/1 |
| 2014/0263800 A1* | 9/2014 | Erlacher | B60R 22/35 |
| | | | 242/384 |
| 2014/0379167 A1 | 12/2014 | Flehmig et al. | |
| 2015/0170519 A1* | 6/2015 | Langgood | G08G 1/163 |
| | | | 701/117 |
| 2015/0262487 A1 | 9/2015 | Cazanas et al. | |
| 2016/0167652 A1* | 6/2016 | Slusar | G06Q 40/08 |
| | | | 701/27 |
| 2016/0169690 A1* | 6/2016 | Bogovich | G08G 1/096816 |
| | | | 701/423 |
| 2016/0280265 A1* | 9/2016 | Hass | B62D 15/0265 |
| 2017/0248950 A1 | 8/2017 | Moran et al. | |

OTHER PUBLICATIONS

Jun. 25, 2019—(CA) Office Action—Application No. 3,014,658 (006591.01851).

Sep. 30, 2019—(EP) Supplemental Search Report—U.S. Appl. No. 17/753,736 (006591.01852).

Jan. 28, 2021—(CA) Office Action—App. No. 3014658 (006591. 01851).

* cited by examiner

ACCIDENT PREDICTION AND CONSEQUENCE MITIGATION CALCULUS

CROSS-REFERENCE TO RELATED APPLICATIONS

The present application is a continuation of U.S. Non-Provisional patent application Ser. No. 15/433,090, filed Feb. 15, 2017, entitled "Accident Prediction and Consequence Mitigation Calculus," which claims priority to U.S. Provisional Patent Application No. 62/295,300, filed Feb. 15, 2016, entitled "Accident Calculus." Each of these applications is hereby incorporated by reference in its entirety herein.

FIELD

Aspects described herein generally relate to autonomous and semi-autonomous vehicle control systems. More specifically, aspects relate to utilization of prediction algorithms to mitigate the consequences associated with an adverse driving event experienced by an autonomous or semi-autonomous vehicle.

BACKGROUND

Autonomous and semi-autonomous car systems are becoming more prevalent. However, knowledge of systems, methods, and computing devices configured to respond to adverse driving conditions are insufficient.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure relate to systems, methods, and computing devices configured to predict that an adverse driving event is likely to occur. Using accident prediction algorithms, a computing device may determine a response to the adverse driving event that is likely to mitigate consequences of the event. After determining the response, the computing device may cause the response to occur.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
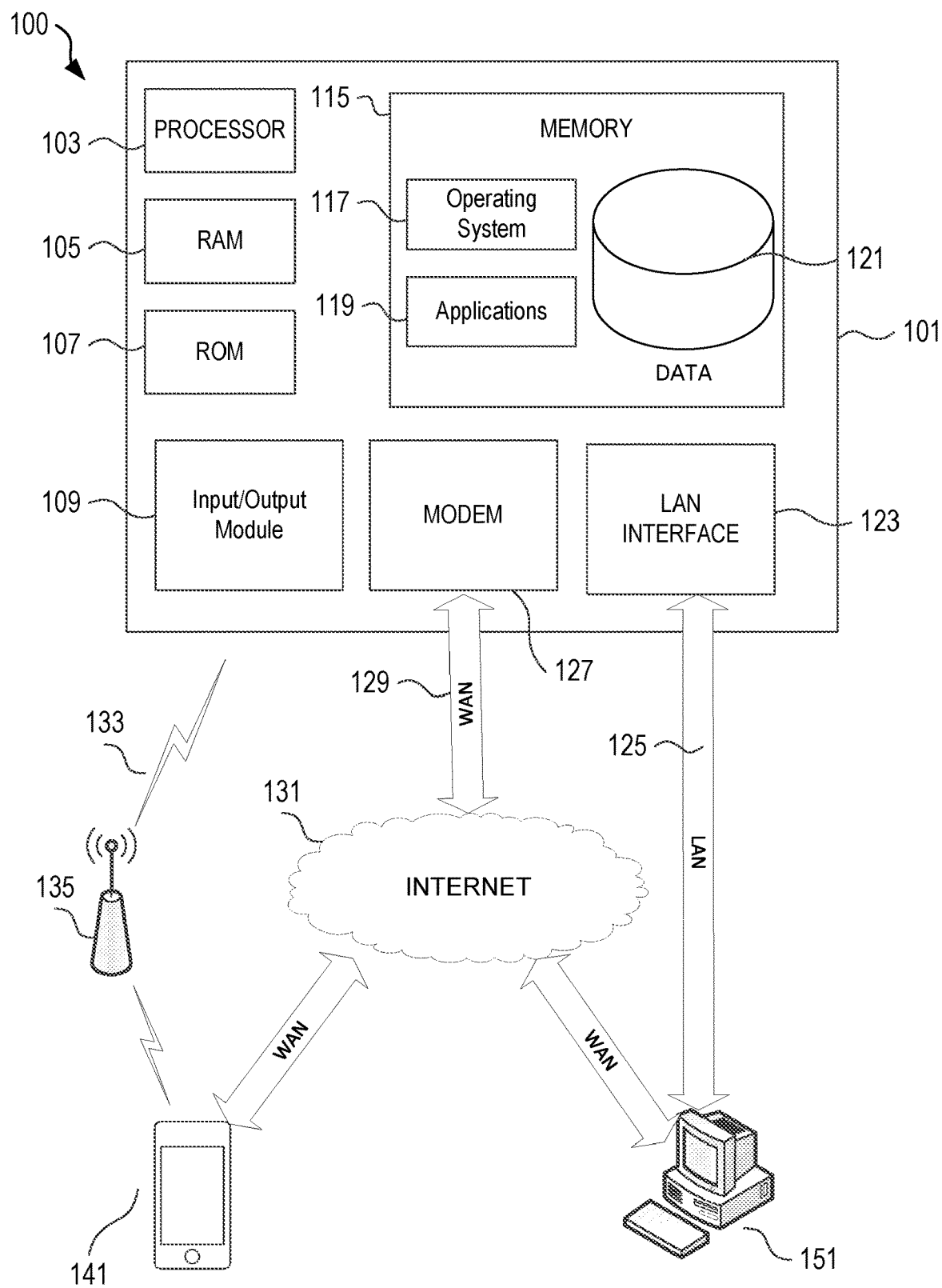
FIG. 1 illustrates a network environment and computing systems that may be used to implement aspects of the disclosure.

FIG. 1 illustrates a block diagram of a computing device 101 in an accident calculus system 100 that may be used according to one or more illustrative embodiments of the disclosure. The computing device 101 may have a processor 103 for controlling overall operation of the computing device 101 and its associated components, including RAM 105, ROM 107, input/output module 109, and memory unit 115. The computing device 101, along with one or more additional devices (e.g., terminals 141, 151) may correspond to any of multiple systems or devices, such as accident calculus devices or systems, configured as described herein for receiving data from various sources and generating via accident calculus algorithms consequence mitigation measures responsive to an adverse driving event.

Input/Output (I/O) module 109 may include a microphone, keypad, touch screen, and/or stylus through which a user of the computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the computing device 101 to execute a series of computer-readable instructions to receive data from various sources and generate via accident calculus algorithms consequence mitigation measures.

The computing device 101 may operate in a networked environment 100 supporting connections to one or more remote computers, such as terminals/devices 141 and 151. Accident calculus computing device 101, and related terminals/devices 141 and 151, may include devices installed in vehicles, mobile devices that may travel within vehicles, or devices outside of vehicles that are configured to receive and process vehicle and other sensor data. Thus, the computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle sensing and telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and multi-dimensional risk score generation system components described herein may be configured to communicate using any of these network protocols or technologies.

Additionally, one or more application programs 119 used by the computing device 101 may include computer executable instructions (e.g., accident calculus algorithms and the like) for receiving data and performing other related functions as described herein.

Figure 2:
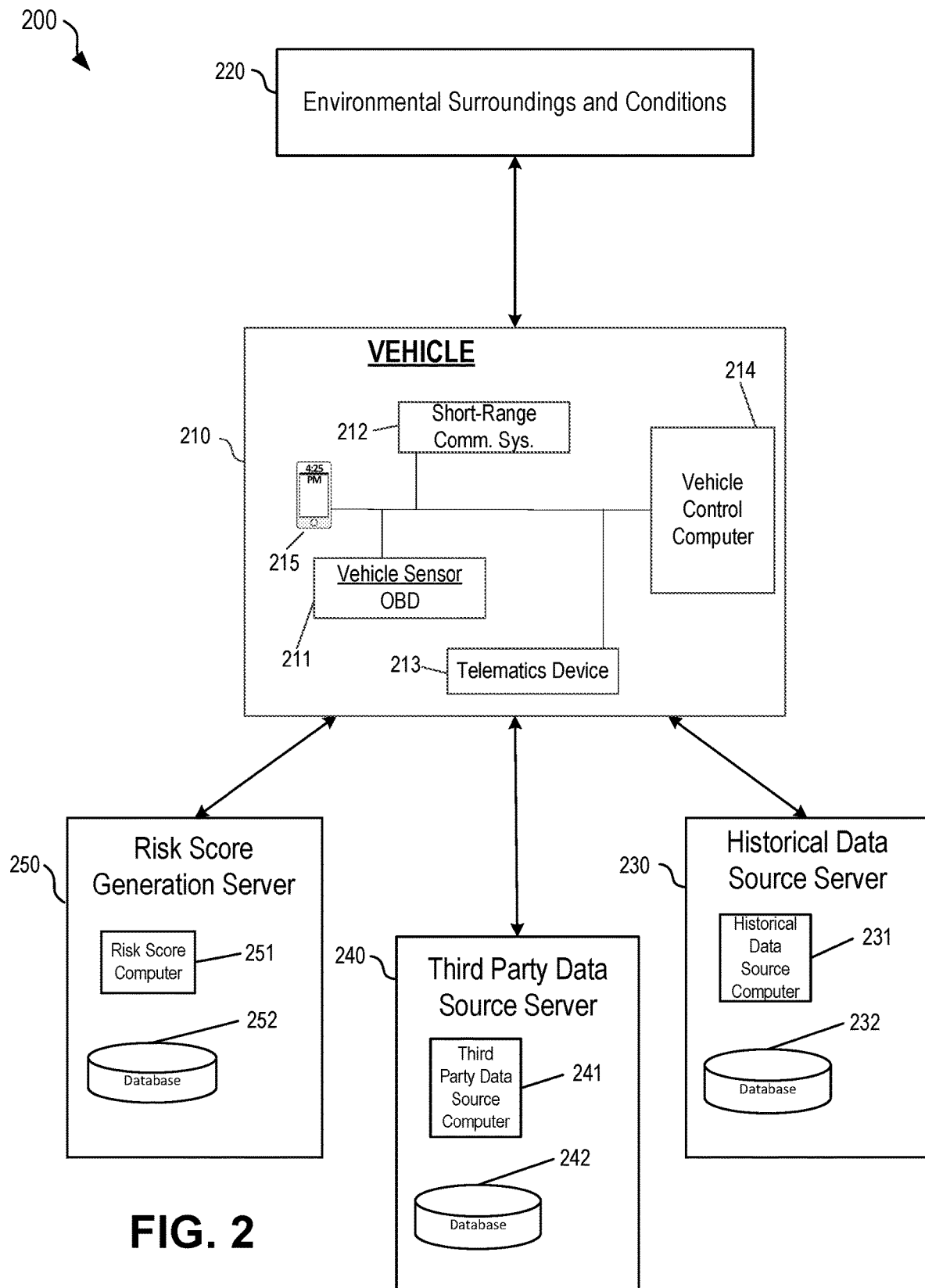
FIG. 2 is a diagram illustrating various example components of an accident calculus system to one or more aspects of the disclosure.

FIG. 2 is a diagram illustrating various example components of an accident calculus system 200 according to one or more aspects of the disclosure. The accident calculus system 200 may include a vehicle 210, environmental surroundings and conditions 220, historical data source server 230, third party data source server, multi-dimensional risk score generation server 250, and additional related components. Each component shown in FIG. 2 may be implemented in hardware, software, or a combination of the two. Additionally, each component of the accident calculus system 200 may include a computing device (or system) having some or all of the structural components described above for computing device 101.

Vehicle 210 may be, for example, an automobile, motorcycle, scooter, bus, recreational vehicle, boat, train, stationary vehicle, or other type of vehicle. Vehicle 210 may be an autonomous or semi-autonomous vehicle. In autonomous driving, the vehicle control computer 214 fulfills all or part of the driving of vehicle 210.

The vehicle 210 may include vehicle operation sensors 211 capable of detecting various performance and/or operational data of the vehicle. For example, sensors 211 may detect data corresponding to the vehicle's location (e.g., GPS coordinates), time, travel time, speed and direction, rates of acceleration or braking, gas mileage, specific instances of sudden acceleration, braking, swerving, distance traveled, suspension type, tire tread degradation, speed of steering servo motors, actual/implied efficacy of braking systems, and the like. Sensors 211 may detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle OBD and the vehicle control computer.

Additionally, sensors 211 may detect information associated with environmental surroundings and conditions 220 around vehicle 210. For example, vehicle sensors 211 may include external cameras and proximity sensors which may detect environmental surroundings and conditions 220 including other nearby vehicles, vehicle spacing, traffic levels, road conditions, traffic obstructions, animals, cyclists, pedestrians, external temperature, rain, snow, light levels, sun position, and other conditions that may factor into driving operations of vehicle 210.

Sensors 211 also may detect data relating to moving violations and the observance of traffic signals and signs by the vehicles 210. Additional sensors 211 may detect data relating to the maintenance of the vehicle 210, such as the engine status, oil level, engine coolant temperature, odometer reading, the level of fuel in the fuel tank, engine revolutions per minute (RPMs), software upgrades, and/or tire pressure.

Certain vehicle sensors 211 may determine when and how often the vehicle 210 stays in a single lane or strays into other lanes. A Global Positioning System (GPS) and/or locational sensors positioned inside the vehicle 210, and/or locational sensors or devices external to the vehicle 210 may be used to determine the lane position, road-type (e.g. highway, entrance/exit ramp, residential area, etc.) and other vehicle position/location data. Vehicle 210 may include other vehicle sensors 211 for monitoring other vehicle performance and operational phenomena, as well as other internal and external phenomena.

In response to detecting the above-mentioned data regarding vehicle 210 and environmental surroundings and conditions 220, vehicle sensors 211 may be configured to transmit the data to one or more internal computing systems including telematics device 213 and/or vehicle control computer 214. Additionally, vehicle sensors 212 may be configured to transmit the above-mentioned data to one or more external computing systems including mobile device 215, historical data source server 230, third party data source server 240, and/or risk score generation server 250 via short-range communication systems 212 and/or telematics device 213.

Short-range communication systems 212 are vehicle-based data transmission systems configured to transmit environmental surroundings and conditions and vehicle performance and operational data to external computing systems and/or other nearby vehicles and infrastructure, and to receive data from external computing systems and/or other nearby vehicles and infrastructure. In some examples, communication systems 212 may use the dedicated short-range communications (DSRC) protocols and standards to perform wireless communications between vehicles and/or external infrastructure such as bridges, guardrails, barricades, and the like.

Short-range communication systems 212 may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. In certain systems, short-range communication systems 212 may include specialized hardware installed in vehicle 210 (e.g., transceivers, antennas, etc.), while in other examples the communication systems 212 may be implemented using existing vehicle hardware components (e.g., radio and satellite equipment, navigation computers) or may be implemented by software running on the mobile device 215 of drivers and passengers within the vehicle 210.

Telematics device 213 may be a computing device containing many or all of the hardware/software components as the computing device 101 depicted in FIG. 1. The telematics device 213 may receive vehicle performance and operational data from vehicle sensors 211, and may be configured to transmit the data to one or more external computer systems over a wireless transmission network.

Telematics device 213 also may be configured to detect or determine additional types of data relating to real-time driving and the condition of the vehicle 210. The telematics device 213 may store the type of vehicle 210, for example, as well as the make, model, trim (or sub-model), year, and/or engine specifications, and autonomous driving system specifications. Additionally, other information such as vehicle owner or driver information, insurance information, and financing information for the vehicle 210 may be stored on telematics device 213.

Telematics device 213 may be configured to receive and transmit data from certain vehicle sensors 211, while other sensors or systems may be configured to directly receive and/or transmit data to external computing systems (e.g., historical data source server 230, third party data source server 240, risk score generation server 250) without using the telematics device. Thus, telematics device 213 may be optional in certain embodiments.

Vehicle control computer 214 (e.g., autonomous vehicle driving system) may contain some or all of the hardware/software components as the computing device 101 depicted in FIG. 1, and may be configured to operate aspects of the driving of vehicle 210, including but not limited to acceleration, braking, steering, and/or route navigation. Additionally, vehicle control computer may be configured to perform the accident calculus algorithms described in further detail below. In order to perform autonomous driving functions, vehicle control computer 214 may be configured to receive, analyze, and act upon vehicle performance and operational data and environmental surroundings and conditions data provided by vehicle sensors 211.

Additionally, vehicle control computer 214 may be configured to receive, analyze, and act upon historical data from historical data source server 230, third party data from third party data source server 240, and risk score data from risk score generation server 250. Such data may be received through short-range communication systems 212 and/or other on-board communication systems. In certain embodiments, vehicle control computer 214 may also be configured to receive, analyze, and act upon data provided by telematics device 213 and mobile device 215. Such data may be used by vehicle control computer 214 to perform autonomous driving functions for vehicle 210, including performance of accident calculus algorithms.

In certain embodiments, mobile computing device 215 within the vehicle 210 may be used to collect vehicle driving data and/or to receive vehicle driving data from vehicle communication systems and then to transmit the vehicle driving data to external computing devices. Mobile computing device 215 may be, for example, a mobile phone, personal digital assistant (PDA), or tablet computer of the driver or passenger(s) of vehicle 210. Software applications executing on mobile device 215 may be configured to detect certain driving data independently and/or may communicate with vehicle sensors 211, telematics device 213, autonomous driving systems, or other vehicle communication systems to receive additional driving data. For example, mobile device 215 may be equipped with GPS functionality and may determine vehicle location, speed, direction and other basic driving data without needing to communicate with the vehicle sensors 211 or any vehicle system.

In other examples, software on the mobile device 215 may be configured to receive some or all of the driving data collected by vehicle sensors 211. Mobile computing device 215 may also be involved with aspects of autonomous driving, including receiving, collecting, and transmitting vehicle operational data regarding autonomous driving and autonomous driving relationships between multiple vehicles.

The accident calculus system 200 may include a historical data source server 230, containing some or all of the hardware/software components as the computing device 101 depicted in FIG. 1. Historical data source 230 may comprise a historical data source computer 231 for receiving and/or processing historical data including insurance claims, accident reports, historical environmental surroundings and conditions and/or historical vehicle operation and performance data associated with insurance claims and accident reports. The historical data source 230 may also comprise a database 232 used to store the historical data collected by the historical data source computer 231. The historical data source computer 231 may transmit the historical data to vehicle 210 for aiding in the performance of accident calculus algorithms as described herein.

The system 200 may include a third party data source server 240, containing some or all of the hardware/software components as the computing device 101 depicted in FIG. 1. Third party data source server 240 may comprise a third party data source computer 241 for receiving and/or processing third party data including current weather condition data, forecasted weather condition data, traffic flow data, road closure data, and/or other data affecting external driving conditions. The third party data source server 240 may also comprise a database 242 used to store the third party data collected by the third party data source computer 241. The third party data source computer 241 may transmit the historical data to the vehicle 210 for aiding in the performance of accident calculus algorithms discussed in further detail below.

The system 200 may include a multi-dimensional risk score generation server 250, containing some or all of the hardware/software components as the computing device 101 depicted in FIG. 1. The multi-dimensional risk score generation server 250 may include a database 252, which may include additional data for the multi-dimensional risk score generation server 250 to process to, for example, generate one or more multi-dimensional risk scores. The multi-dimensional risk score generation computer 251 may analyze data received from the various data sources. The multi-dimensional risk score generation server 250 may initiate communication with and/or retrieve data from the vehicle 210 and other components within system 200.

Multi-dimensional risk scores and profiles may comprise a framework that identifies risk-related information and identifies a method to quantify data related to geo-spatial, environmental, and/or driver behavior. This framework may allow an autonomous vehicle driving system to understand and act on how, when, and why adverse events occur on roads or other locations.

The multi-dimensional risk score generation server 250 may identify and quantify one or more variables. For example, the server may determine which risk factors on road segments can impact a vehicle and occupants included therein. The system may determine (e.g., quantify and/or create) a probability of an adverse event occurring. The probability may be range bound. The server may determine the potential cost (e.g., in dollars) of an adverse event, such as an accident. The server may determine potential human impact of an adverse event. The server may create, quantify, and/or represent one or more links between a vehicle attribute (e.g., a type, a make, an age, a condition, etc.) and the environment in which the vehicle is being operated, so that the adverse events may be predicted in a structured and interconnected way.

Vehicle control computer 214 may pull data, seamlessly and in real-time, from any one, or combination of, vehicle sensors 211, telematics device 213, mobile device 215, historical data source server 230, third party data source server 240, and/or multi-dimensional risk score generation server 250. The data provided may enable vehicle control computer 214 to perform autonomous driving actions for vehicle 210 as well as perform accident calculus algorithms when an adverse driving event occurs.

During adverse driving circumstances and/or events wherein vehicle 210 is likely to be or predicted to be involved in an accident, vehicle control computer 214, based on a plurality of criteria and/or factors and through the utilization of accident calculus algorithms, may be configured to determine and cause vehicle driving actions necessary to mitigate accident consequences.

Figure 3:
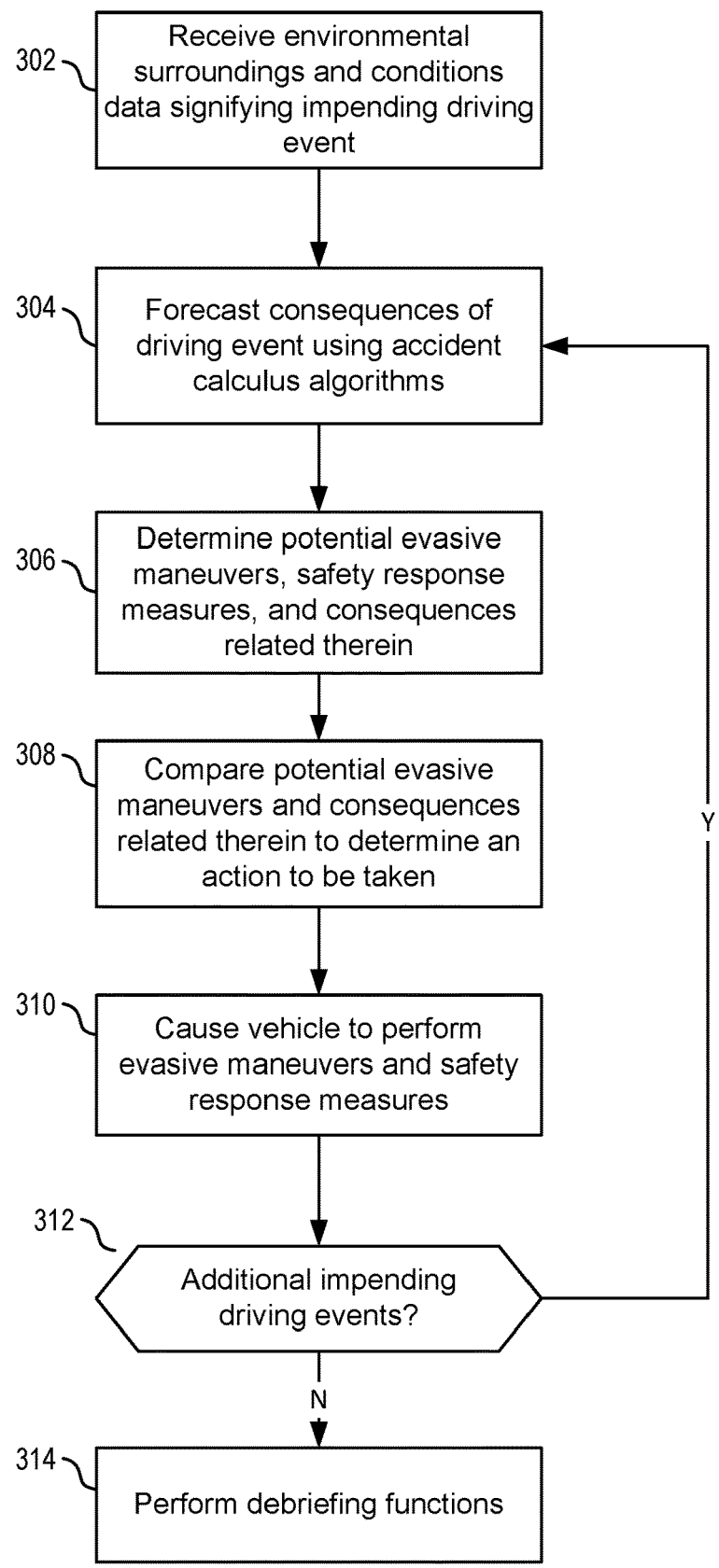
FIG. 3 is a flow diagram illustrating an example method of consequence mitigation measures taken by a vehicle responsive to an adverse driving event according to one or more aspects of the disclosure.

FIG. 3 is a flow diagram illustrating an example method of consequence mitigation measures taken by a vehicle responsive to an adverse driving event according to one or more aspects of the disclosure.

At step 302, vehicle control computer 214 may receive environmental surroundings and conditions data from vehicle sensors 211 indicating that vehicle 210 is likely to be involved in an adverse driving event (e.g., accident). The data provided by vehicle sensors 211 may include direct involvement data indicating what type of vehicle and/or entity will be directly involved in the event (e.g., bicycle, motorcycle, truck, 18 wheeler, train, building, pedestrian, etc.) and a relative mass, velocity, acceleration, and trajectory of the involved vehicle, peripheral involvement data indicating immediate by-standing vehicles, pedestrians, and/or infrastructure, and relative masses, velocities, accelerations, and trajectories thereof, and environmental data including temperature, precipitation levels or lack thereof, road quality and type (e.g., iced mountain road with significant curvature and minimal guard rails). Other types of data within the direct involvement, peripheral involvement, and environmental categories may be provided. In some instances, vehicle control computer 214 may receive such data from any one, or combination of, sensors 211, telematics device 213, mobile device 215, historical data source server 230, third party data source server 240, and/or risk generation score server 250. In other instances, risk score generation server 250 may receive such data.

Additionally, ancillary data regarding immediately and peripherally involved entities (e.g., bicycle, motorcycle, truck, 18 Wheeler, train, building, external infrastructure, etc.) may be provided to the vehicle control computer 214 of vehicle 210 through short-range communication systems 212. For example, ancillary data may include information such as, but not limited to, vehicle performance and/or operational data and passenger and/or cargo data of immediately and peripherally involved vehicles, as well as infrastructure type and function data of immediately and peripherally involved infrastructure. Such data may be received by short-rand communication systems 212 continuously and in real-time and may be utilized in the accident calculus algorithms described in further detail below during an adverse driving event.

At step 304, through the utilization of multivariable accident calculus algorithms, vehicle control computer 214 may process and/or analyze the direct involvement, peripheral involvement, environmental data, and/or ancillary data received from vehicle sensors 211 and/or short-range communication systems 212 in tandem with vehicle performance and/or operational data of vehicle 210 (e.g., real-time velocity, acceleration, mass, break activation, tire tread life, speed of steering servo motor, actual/implied efficacy of braking systems, suspension, steer column orientation, number of passengers, positioning of passengers, type of cargo onboard, etc.) to determine, predict, and/or forecast probable consequences if the accident were left to occur without any intervention by vehicle driving system 214 (e.g., swerving out of the way of an oncoming vehicle, forcefully applying brakes, and the like).

The forecasting of probable consequences may entail determining the initial effects caused by the immediately involved vehicle, cascading effects caused to other entities responsive to the initial effects, as well as the degree to which all involved entities will be affected (e.g., minor damage to vehicle 210, moderate to severe injuries to occupants of an external vehicle, death of a pedestrian, and the like).

In some instances, vehicle control computer 214 may perform such calculations alone, or in tandem with risk score generation server 250. For example, depending on the complexity of the multivariable accident calculus equations and processing power necessary to solve such equations, risk score generation server 250 may aid vehicle control computer 214 in generating solutions and/or generate complete solutions for vehicle control computer 214.

At step 306, which may be performed concurrently with, or subsequent to, step 304, vehicle control computer 214 may formulate a plurality of potential evasive maneuvers that may be taken by vehicle 210 prior to impact of the directly involved vehicle and/or entity via accident calculus algorithms. In certain embodiments, vehicle control computer 214 may additionally formulate safety response measures associated with each potential evasive maneuver of the plurality of evasive maneuvers to mitigate the probability of injury to passengers within vehicle 210. For example, depending on the formulated evasive maneuver, vehicle control computer 214 may alert passengers to the impending adverse driving incident, tighten passenger seatbelts, activate airbags and fire retardant systems, turn on interior vehicle lights, unlock doors, roll up and/or roll down windows, and the like.

In certain instances, projected and/or forecasted consequences of the potential evasive maneuvers may also be determined. The formulated potential evasive maneuvers and associated consequences may be populated in an evasive maneuver determination matrix for streamlining and consolidating decision making of vehicle computer 214.

Potential evasive maneuvers may be calculated via accident calculus algorithms and the forecasted consequences associated with such maneuvers may be weighted based on considerations including type, amount, and cost of vehicle and infrastructure damage likely to be incurred, as well as type, amount, and severity of injuries likely to occur to occupants of vehicle 210, external vehicles, and pedestrians.

In certain embodiments, the potential evasive maneuvers may be made by comparing and/or matching the above-mentioned data (e.g., direct involvement, peripheral involvement, environmental, and/or vehicle performance and/or operational) to prior incident data stored in historical data source server 230 and/or multi-dimensional risk score generation server 250 to determine a set of maneuvers of known outcomes.

In some instances, vehicle control computer 214 may perform such calculations alone, or in tandem with risk score generation server 250. For example, depending on the complexity of the multivariable accident calculus equations and processing power necessary to solve such equations, risk score generation server 250 may aid vehicle control computer 214 in generating solutions and/or generate complete solutions for vehicle control computer 214.

At step 308, vehicle control computer 214 may determine from the totality of potential evasive maneuvers an action, or lack thereof, to be made and/or taken, as well as associated safety response measures. In some instances, the determination of an evasive maneuver to be taken may be made by comparing the various generated potential evasive maneuvers and consequences related thereto to determine an option likely to incur the least amount of damage to vehicle 210 and/or injury to occupants riding therein, as well as damage to external vehicles and/or injury to accompanying occupants, and injury to pedestrians. Such an option may be considered a safe accident option and may entail getting into an accident that is safer for the passengers and/or pedestrians involved, but more damaging to the vehicles involved. Depending on the vehicles involved in the adverse driving incident (e.g., autonomous or semi-autonomous vehicles with the capacity for computer automated intervention), the vehicles may work collaboratively in achieving such a safe accident.

In some embodiments, the determination of an evasive maneuver to be taken may be defined by vehicle tenets. Such vehicle tenets may form guiding logical rules (e.g., human injury is invaluable in comparison to property damage, human in vehicle 210 is more valuable than human in directly involved vehicle, etc.) that must be abided by when selecting an evasive maneuver to be taken. In some instances, vehicle control computer 214 may perform such calculations alone, or in tandem with risk score generation server 250.

In other embodiments, after determining evasive maneuvers and safety response measures to be taken, vehicle control computer 214 may broadcast the chosen maneuver via short-range communication systems 212 to directly and peripherally involved vehicles and/or infrastructure. Additionally, vehicle control computer 214 may be configured to receive information relating to chosen evasive maneuvers from directly and peripherally involved vehicles. Through the utilization of such information relating to the chosen evasive actions of all vehicles involved, involved entities may be able to coordinate actions to further mitigate consequences of an adverse driving event.

At step 310, vehicle control computer 214 may cause vehicle 210 to perform the actions necessitated by the chosen evasive maneuver, as well as the safety response measures associated with the chosen evasive maneuver. While performing the evasive actions and safety response measures, vehicle control computer 214 may be receiving environmental surroundings and conditions data from vehicle sensors 211 seamlessly and in real-time. Such data may be transmitted from sensors 211 to vehicle control computer 214 under any circumstances resulting from the chosen evasive maneuver (e.g., evasive maneuver resulting in an adverse incident and/or accident, avoidance of an accident, etc.).

At step 312, vehicle control computer 214 may determine whether or not the received environmental surroundings and conditions data indicate if an additional adverse driving event may occur. For example, if after swerving out the way of an oncoming vehicle, received environmental surroundings and conditions data may indicate that vehicle 210 is now presented with an additional adverse driving event (e.g., that after completion of the first evasive maneuver vehicle 210 is now inline to hit immediate infrastructure). In such instances, vehicle control computer 214 return to step 304.

Alternatively, if vehicle control computer 214 determines that the received environmental surroundings and conditions data indicates that that no other adverse driving events are immediately pending, vehicle control computer 214 may proceed to step 314. In such an instance, vehicle control computer 214 may be configured to debrief from the adverse driving event by, for example, assessing damage to vehicle 210, external vehicles and infrastructure, and the like. Additionally, based on the debriefing assessment, vehicle control computer 214 may be configured to alert emergency response teams and/or call a tow truck. Other responses may be possible. For instance, vehicle control computer 214 may be configured to create a driving incident report that compiles relevant data (e.g., vehicle performance and/or operational data of vehicle 210, immediately involved vehicles, and peripherally involved vehicles) regarding the adverse driving incident. Such information may be provided to emergency response teams in order to provide insight into the fault surrounding the adverse driving incident.

In some instances, vehicle control computer 214 may retrospectively analyze the totality of adverse driving incident data and information related to the taken evasive maneuver to apply and/or vary respective weights associated with the input variables of the accident calculus algorithms in order to provide safer evasive maneuvers in the event of future adverse driving incidents. In doing so, vehicle control computer 214 may be able to self-improve and provide better vehicle responses to future adverse driving events. Alternatively, risk score generation server 250 may be able to perform such a retrospective analysis.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:
receiving, from at least one sensor associated with a vehicle, data signifying an impending driving event;
determining a plurality of potential evasive maneuvers;

determining one or more consequences for performing each of the plurality of potential evasive maneuvers;

comparing, based on a weight associated with each of the one or more consequences of each of the plurality of potential evasive maneuvers, the plurality of potential evasive maneuvers;

determining, based on the comparison, an evasive maneuver of the plurality of potential evasive maneuvers to perform;

selecting, from a plurality of safety response measures, one or more safety response measures associated with the evasive maneuver; and causing, via a vehicle control computer, the vehicle to perform both the evasive maneuver and the one or more safety response measures.

2. The method of claim 1 further comprising:
determining an additional adverse driving event will occur after the evasive maneuver is performed.

3. The method of claim 1 further comprising generating a report based on the impending driving event and the evasive maneuver.

4. The method of claim 1, wherein the impending driving event is an accident.

5. The method of claim 1, wherein the data indicates at least one of a type of vehicle or entity will be involved in the impending driving event.

6. The method of claim 1, wherein the data indicates at least one of a temperature, a precipitation level, a road quality or a road type associated with the vehicle.

7. The method of claim 1, wherein the at least one sensor includes at least one of a camera or a proximity sensor.

8. A system comprising:
a processor; and
memory storing computer-executable instructions that, when executed by the processor, cause the processor to:
receive, from a vehicle sensor, data indicating an adverse driving event associated with a vehicle is likely to occur;
determine a plurality of potential evasive maneuvers;
predict one or more consequences for performing each of the plurality of potential evasive maneuvers;
compare, based on a weight associated with each of the one or more consequences for each of the plurality of potential evasive maneuvers, the plurality of potential evasive maneuvers;
select, based on the comparison, an evasive maneuver of the plurality of potential evasive maneuvers;
select, from a plurality of safety response measures, a safety response measure associated with the evasive maneuver; and
cause a vehicle control computer to control the vehicle to perform both the evasive maneuver and the safety response measure.

9. The system of claim 8, wherein the memory storing further computer-executable instructions that, when executed by the processor, further cause the processor to:
predict an additional adverse driving event will occur after the evasive maneuver is performed.

10. The system of claim 8, wherein the memory storing further computer-executable instructions that, when executed by the processor, further cause the processor to:
output a report based on the adverse driving event and the evasive maneuver.

11. The system of claim 8, wherein the adverse driving event is an accident.

12. The system of claim 8, wherein the data indicates at least one of a type of vehicle or entity will be involved in the adverse driving event.

13. The system of claim 8, wherein the data indicates at least one of a temperature, a precipitation level, a road quality or a road type associated with the vehicle.

14. The system of claim 8, wherein the vehicle sensor includes at least one of a camera or a proximity sensor.

15. One or more non-transitory, computer-readable storage media storing computer-readable instructions that, when executed, cause a processor to:
receive, from a sensor associated with a vehicle, data indicating a driving event associated with the vehicle is impending;
determine a plurality of potential evasive maneuvers in response to the driving event;
forecast one or more outcomes for performing each of the plurality of potential evasive maneuvers;
compare each of the one or more outcomes for each of the plurality of potential evasive maneuvers;
determine an evasive maneuver of the plurality of potential evasive maneuvers;
determine, from a plurality of safety response measures, a safety response measure associated with the evasive maneuver; and
cause a vehicle control computer to control the vehicle to execute both the evasive maneuver and the safety response measure.

16. The one or more non-transitory, computer-readable storage media of claim 15, storing further instructions that, when executed, further cause the processor to:
forecast an additional adverse driving event will occur after the evasive maneuver is executed.

17. The one or more non-transitory, computer-readable storage media of claim 15, storing further instructions that, when executed, further cause the processor to:
output a report based on the driving event and the evasive maneuver.

18. The one or more non-transitory, computer-readable storage media of claim 15, wherein the data indicates at least one of a type of vehicle or entity will be involved in the driving event.

19. The one or more non-transitory, computer-readable storage media of claim 15, wherein the data indicates at least one of a temperature, a precipitation level, a road quality or a road type associated with the vehicle.

20. The one or more non-transitory, computer-readable storage media of claim 15, wherein the sensor includes at least one of a camera or a proximity sensor.

* * * * *